Nov. 18, 1958   D. C. R. JONES ET AL   2,860,957
MANUFACTURE OF COAL BRIQUETTES
Filed Nov. 19, 1954   5 Sheets-Sheet 1

Nov. 18, 1958    D. C. R. JONES ET AL    2,860,957
MANUFACTURE OF COAL BRIQUETTES
Filed Nov. 19, 1954    5 Sheets-Sheet 2

Nov. 18, 1958 D. C. R. JONES ET AL 2,860,957
MANUFACTURE OF COAL BRIQUETTES
Filed Nov. 19, 1954 5 Sheets-Sheet 5

United States Patent Office 2,860,957
Patented Nov. 18, 1958

2,860,957
MANUFACTURE OF COAL BRIQUETTES

David Clarence Rhys Jones, Cheltenham, and Harry Rex Gregory, Piffs Elm, Cheltenham, England, assignors to Coal Industry (Patents) Limited, London, England Application November 19, 1954, Serial No. 470,106
Claims priority, application Great Britain November 24, 1953
22 Claims. (Cl. 44—10)

This invention relates to improvements in the manufacture of briquettes and an object of the invention is to enable briquettes to be produced from materials in divided form without the use of a binder.

The invention is envisaged as being of particular application to the production from black coal of briquettes of high strength (as hereinafter defined), but the invention is not necessarily limited to this application and may also be applied to making high strength briquettes from other materials.

By the "strength" of a briquette is meant in general the tensile strength, to measure which the briquette must be subjected to tensile stress. In the case of cylindrical briquettes however, the breakdown crushing strength obtained by measuring the compressive load applied transversely across a diameter which causes failure of the briquette, will provide a satisfactory method of comparing the strength of briquettes. All the figures of strength given in this specification were obtained by this method as follows: the load in pounds P at which failure occurred with a cylindrical briquette of diameter $d$ inches and length $l$ inches was measured and the strength taken as $$\frac{P}{dl}$$

pounds per square inch. For briquettes of other shapes, a direct tensile test must be employed.

Brown coal can be conveniently briquetted without a binder, but the briquetting of black coal directly without a binder is fraught with difficulties. It is known that very fine black coal may be so briquetted, e. g. coal of size below 200 mesh but the pressures required are very high, i. e. at least 15 tons/in.$^2$. It is also known that briquettes of black coal can be made at lower pressures if the size distribution of the coal particles is controlled, the air largely eliminated from between the particles by pre-consolidation or by replacement with steam, and the temperature of the coal raised to a value, e. g. 150° C.–320° C., at which the coal becomes softer.

It is further known that briquettes of black coal can also be made at lower pressures if the temperature of the coal is raised to a higher value, e. g. 400° C.–440° C., at which the coal agglutinates.

For example in British patent specification No. 616,857 there is described a process for making coal briquettes which comprises the steps of consolidating (e. g. into ribbon or pellet form) a mixture of freshly ground coal grains of at least two different size ranges, the smaller or smallest of these ranges having a particle size of 20 microns and under, heating the preconsolidated mixture to a temperature not exceeding 320° C. in order to produce some softening thereof substantially without oxidation, and moulding the heated mixture under pressure to form briquettes.

It is an object of the present invention to produce binderless black coal briquettes having a high strength as hereinafter defined whilst obviating the necessity for taking the special steps or using very fine coal, or of pre-consolidating, sizing and heating essential to such earlier processes.

The present invention is based on the discovery that if force is applied to a pre-compacted mass of particles so as to set up shearing stress therein and to cause the mass while under pressure to undergo angular shear strain of appropriate magnitude and distribution the particles will adhere together more firmly and form a much stronger briquette than if the same force were applied under otherwise identical conditions.

In the case of black coal, briquettes of cylindrical form must have a strength of at least 100 lbs./sq. in. if they are to withstand handling and transportation satisfactorily and it is impossible to achieve strengths of this order by known methods without resorting to the special steps previously mentioned. Thus, for example, as will be explained in greater detail hereinafter, a "simple push" press using a pressure of 6 tons/sq. in. on a given sample of coal particles resulted in a briquette of 35 lbs./sq. in. crushing strength whereas briquettes made from the same coal sample according to the process of the invention and using the same pressure had a strength of 240 lbs./sq. in.

With many materials, by the application of our invention, it will be found that the resulting briquette can be made to have a strength at least twice (and indeed in some cases seven or more times) that of a briquette produced with the same forces by the known processes in which any shear strain that may result is an accidental and unintentional effect.

There are some materials such as quartz crystal and some varieties of coke which even under very high pressures, for example 30 tons/in.$^2$ do not produce a briquette in a simple push press and there will be no improvement in using the method of the invention with such materials. We believe that this inability to produce briquettes with the said materials may be due to the fact that particles of these materials remain wholly elastic under the pressures applied. There may be other materials which are also subject to this limitation but, by means of a few simple tests with apparatus such as that shown in Figures 2 and 3 or Figures 4 to 6 and described hereafter, it will be easy to discover whether any given material is suitable for briquetting according to the invention.

In general, by making use of the available forces in such a way as to cause angular shear strain of appropriate magnitude and distribution in a mass of particles while the mass is under pressure, it will be found that the strength of the resulting briquette will be such that it would be regarded by one skilled in the art as high when compared with that of briquettes produced by known processes using the same forces and otherwise under conditions that are identical (e. g. as to temperature, particle size, distribution, etc.) in all other respects save that any shear strain that may occur is an accidental and unintentional effect. It is in this sense that a briquette is to be understood as having a high strength throughout this specification and in the claims.

Accordingly the invention consists in a method of making a briquette wherein a mass of particles while under pressure is caused to undergo angular shear strain of such magnitude and distribution as to produce a briquette of high strength.

The invention also consists in a method of making a briquette wherein pressure is applied to a quantity of particles to form a compacted mass which while held under pressure is thereafter, also by the application of pressure, caused to undergo angular shear strain, the mode of application of the last mentioned pressure being designed so that the said shear strain has such magnitude and distribution as to produce a briquette of high strength. The term "the mode of application of said last-mentioned pressure" means the location, direction and magnitude of said last-mentioned pressure.

The invention further consists in a method of making a briquette wherein pressure is applied to a quantity of particles to form a compacted mass and thereafter while the mass is held under pressure, the whole mass or an external face thereof is caused to undergo a substantial change in shape or configuration to set up within the mass angular shear strain having such magnitude and distribution as to produce a briquette of high strength. Such change in shape or configuration may be general and take place over the whole mass or over the whole of one or more external faces, e. g. by distorting the cross section of the mass from a rectangle to a parallelogram or from a circle to an ellipse, or the change may be local, as for example by forming a recess or depression at some locality in an external face.

It is necessary to ensure that the shearing stress within the briquette shall at all points be less than that value which will cause the formation of slip planes and failure resulting in a weak briquette; this value is hereinafter referred to as the ultimate shearing stress, and it is to be understood that all the claims of this specification are subject to this limitation. The formation of a slip plane can be readily observed by visual examination.

The ultimate shearing stress is given by the relationship $S = \sigma \tan \phi + C$; where $S$ is the shearing stress, $\sigma$ is the principal stress, $\phi$ is the angle of internal friction and $C$ is the cohesion of the finished briquette.

It is necessary to ensure that the angular shear strain is distributed throughout the briquette but not necessarily uniformly (although in many cases uniformity will be an advantage) and it is also necessary that a minimum shear strain is effected at substantially all points throughout the mass if the briquette is to be satisfactory. We have found that with black coal, in order to make briquettes which will have strengths regularly in excess of 100 lbs./sq. in. it is preferable so to arrange the apparatus that the greater part of the mass will have an angular shear strain of at least 20° and it will also be advantageous for a substantial part of the briquette (i. e. at least 25% by volume) to have an angular shear strain of at least 30°.

We describe hereafter apparatus suitable for the practice of our invention and we give examples of the use of one of such apparatus with various materials and under different conditions. It will be readily apparent that, by varying the forces and other conditions employed and by altering the dimensions and configuration of the apparatus which it is desired to use, the reader will be able with other materials and conditions, if necessary with the aid of a few simple tests, to select the dimensions and configuration of apparatus and the conditions of use thereof suitable for attaining the appropriate magnitude and distribution of angular shear strain.

In any process where a mass of particles is subjected to pressure some angular shear strain will take place and therefore, in briquettes made by the known simple push press, angular shear strain and shearing stress will also be present to some extent.

However, with such known presses the existence of angular shear strain and shearing stress in the briquette is an incidental and unintentional effect, and has a relatively high value at only a few localized points (see Figures 7, 9 and 11). The method of the present invention is essentially differentiated from that which is carried out in the known briquetting presses in that the mode of application (i. e. the location, direction and magnitude) of the pressure applied to the mass of particles intended to form the briquette is from the outset consciously and carefully determined so that the angular shear strain has the appropriate magnitude and distribution to produce a briquette of high strength while at the same time the shearing stress is at all points less than the ultimate shearing stress.

Thus in an example, (of which greater details are given hereafter), of a typical black coal briquette made by the process of the invention, at a pressure of 6 tons per square inch the angular shear strain was found to vary gradually at different points in the briquette up to at least 50° and over the greater part of the briquette the angular shear strain was 20° or more. On the other hand, with the same material, particle sizing and temperature, a pressure of 6 tons per square inch in the known simple push press produced a briquette having an angular shear strain at only a few localized points of 20° but over the greater part of this briquette the angular shear strain was below 14°.

In the case of black coal the angular shear strain necessary to form a strong briquette will in many cases be sufficient to cause plastic flow and the particle boundaries will thus be in intimate contact over a substantial part of their area. This phenomenon may be readily seen, for example, by a microscopic examination of a polished section of the briquette. Furthermore, the structure of the briquette in respect of for example, porosity, density, specular reflectivity and visual appearance of a cross section ground in a suitable way (e. g. on emery paper) will in such cases be substantially the same as that of the coal from which the particles were originally derived.

The method of the invention may be applied to other materials, including other non-metallic materials e. g. catalysts of the alumini-silica type, and metals—e. g. aluminium and copper.

In the case of coal, the starting material may consist of or comprise a mixture of coking and non-coking coals, and part of the starting material may be oxidised, while another part may be non-oxidised. It may also be possible to use a starting mateiral wherein a part of the coal is carbonised and a part is non-carbonised. The starting material may also contain a percentage of anthracite and/or coke. Alternatively, or in addition, the starting material may be coal of low volatile content, e. g. 7%, or coal of high volatile content, e. g. 40%, or a mixture thereof.

The size and shape of the briquettes may vary within wide limits, and the dimensions and size grading of the particles of the material used may also vary. For example, for a 2 inch diameter black coal briquette a convenient maximum size of particle is 30 mesh (British standard specification) B. S. S. while for a 4 inch diameter briquette, a maximum size of 10 mesh may be permissible.

The pressure used in the formation of a briquette in the process of the invention may be applied as a continuous pressure or in two or more discontinuous stages. Pressure may be successively applied in two different directions, and between adjacent stages the pressure may be partly or wholly released but in the latter case pressure is re-applied before causing the angular shear strain. The pressures in the discontinuous stages may be of the same magnitude or of different magnitudes, but the final pressure should not be substantially less than the initial pressure.

Some or all of the particles of the starting material may be heated before or during the briquetting process.

To obtain briquettes of maximum strength for any one kind of coal it is necessary to control the moisture content; for operation at room temperature the optimum value of moisture content is slightly below the "air-dry" moisture content (i. e. no surface moisture is present on the particles). It is also desirable to avoid oxidation.

It is possible by means of our invention to produce satisfactory briquettes without the aid of binders. Binders may also be used, however, and we do not exclude their use from the scope of our invention, if their use is desired.

There are a number of means by which the desired angular shear strain may be induced in a mass of particles under pressure.

By way of example some forms of suitable means are described hereinunder with reference to the accompanying drawings in which.

Figure 1:
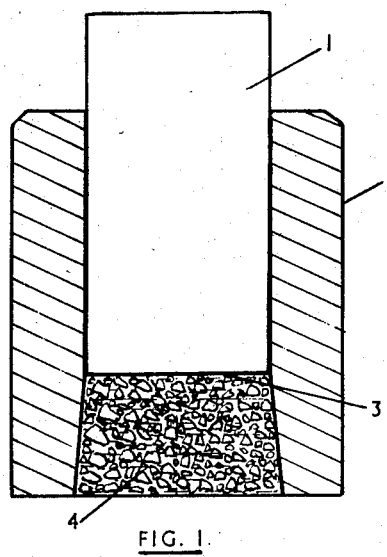
Figure 1 illustrates diagrammatically a known form of briquetting press.

In Figure 1 a plunger 1 applies pressure downwards on a mass of particles in a cylindrical mould 2, the bottom face 3 of the plunger 1 having substantially the same diameter as the internal diameter of the mould 2 to form a briquette 4. This kind of known briquetting press is herein referred to as a "simple push" press.

Figure 2:
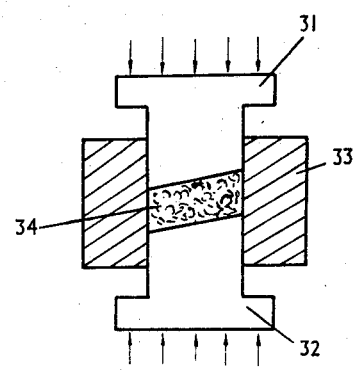
Figures 2 and 3 illustrate diagrammatically one form of press for carrying out the process according to the invention.
Figure 3:
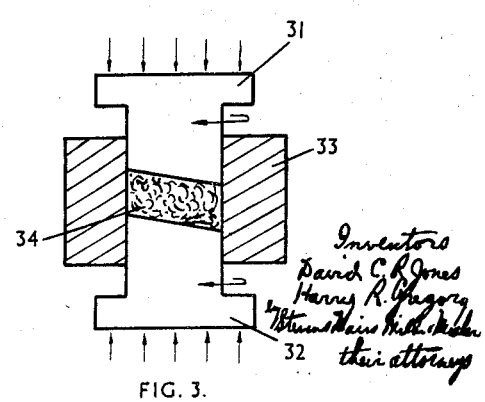

In Figure 2 the coal particles are compacted in a split mould 32 of cylindrical cross section by two oblique ended rams 31, 32 which are then rotated in the same direction simultaneously relative to the mould 33 and to the particles contained therein to cause the briquette to deform and in so doing to take up the position of Figure 3.

Figure 4:
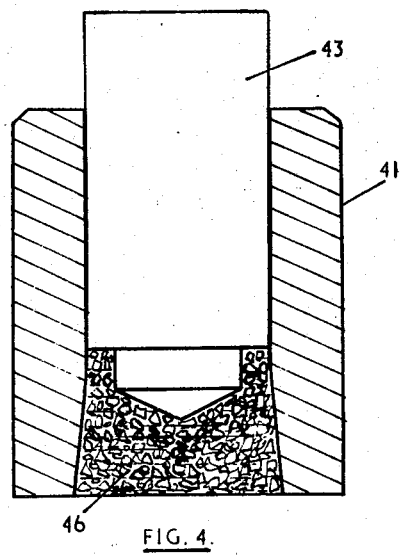
Figures 4 to 6 illustrate a second form of press.
Figure 5:
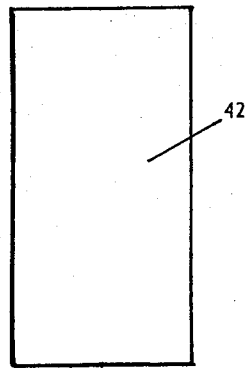
Figure 6:
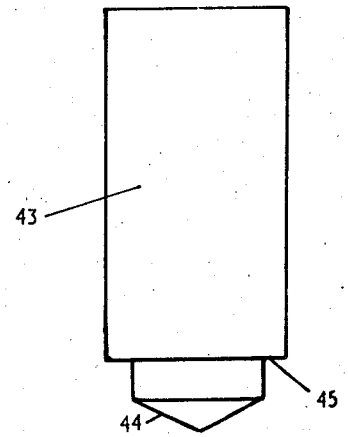

In Figures 4 to 6 the particles are held in a mould 41 and two rams of different shape are used in sequence; i. e. a flat ended cylindrical ram 42 followed by a ram 43 having a central cylindrical projection 44, the force applied being the same in both cases and resulting in a briquette 46.

In use the mould is closed at its lower end which is slightly tapered to allow for easy removal of the finished briquette and the rams enter from the top.

Some examples of the application of the invention to black coal, to a metal and to a non-metal other than coal will now be described with reference to Figures 4 to 6 and 7 to 12. In all these examples the process of the invention was carried out with the apparatus of Figures 4 to 6, and in all cases the mould 41 had an outer diameter of 2½ inches, an inner diameter of 1¼ inches, a height of 2½ inches and a 3° angle of taper at the base. The length of cylindrical portion of projection 44 was 0.22 in., diameter 0.84 inch and the conical angle of the said projection was 140°.

*Example 1*

20 grams of black coal of rank 901 (according to the coal classification of the Fuel Research Board, Survey Paper No. 58, 1946), having volatile content 41%, ash content 5.8%, moisture content 12.5% were ground to a size below 30 mesh British standard specification and briquetted at a temperature of 18° C. and a pressure of 6 tons/sq. in. This briquette had a strength of 240 lbs./sq. in. A briquette with the same coal and under the same conditions but made with the simple push press of Figure 1 gave a strength of 35 lbs./sq. in.

Figure 7:
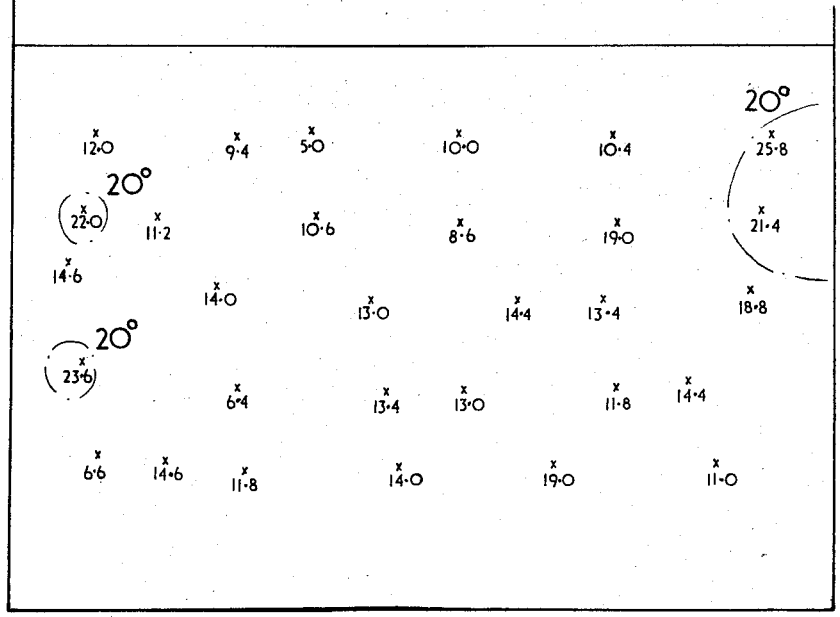
Figures 7 to 12 are diagrams showing the shear strain produced with a known press and with the press of Figures 4 to 6.
Figure 8:
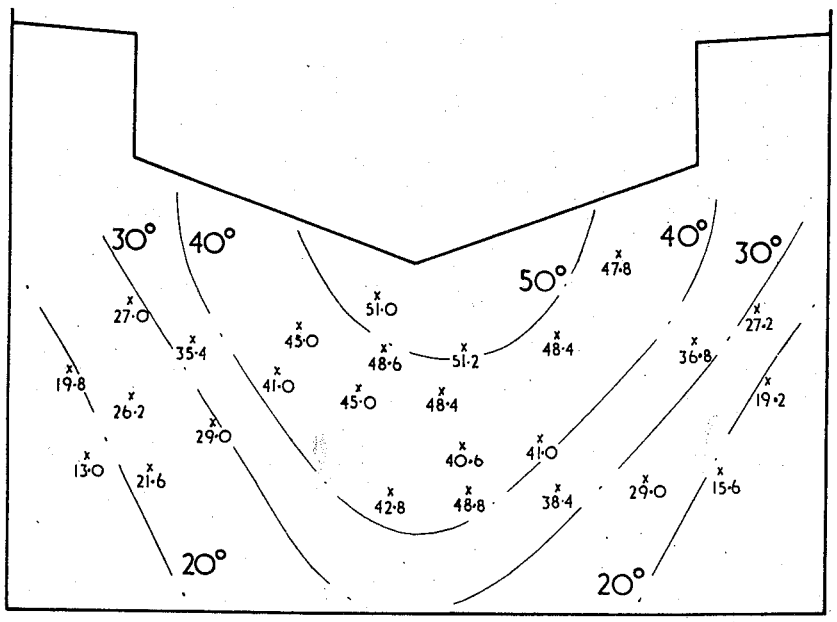

Figure 7 is a shear strain diagram for the briquette made with the simple push press and Figure 8 is a similar diagram for the briquette made by the process of the invention; the values of angular shear strain at various points being indicated by the numbers and curves. It will be seen that in Figure 7 the angular shear strain is more than 20° only at three localised regions while the greater part of the briquette has an angular shear strain less than 14°.

On the other hand in Figure 8 the greater part of the briquette has an angular shear strain of 30° or over and a substantial part has an angular shear strain of 40° or more.

*Example 2*

30 grams of aluminium powder below 30 mesh B. S. S. were briquetted at 18° C. and a pressure of 6 tons/in.²

This briquette had a strength of 1750 lbs./sq. in. A simple-push briquette of the same material made under the same conditions had a strength of 280 lbs./sq. in.

Figure 9:
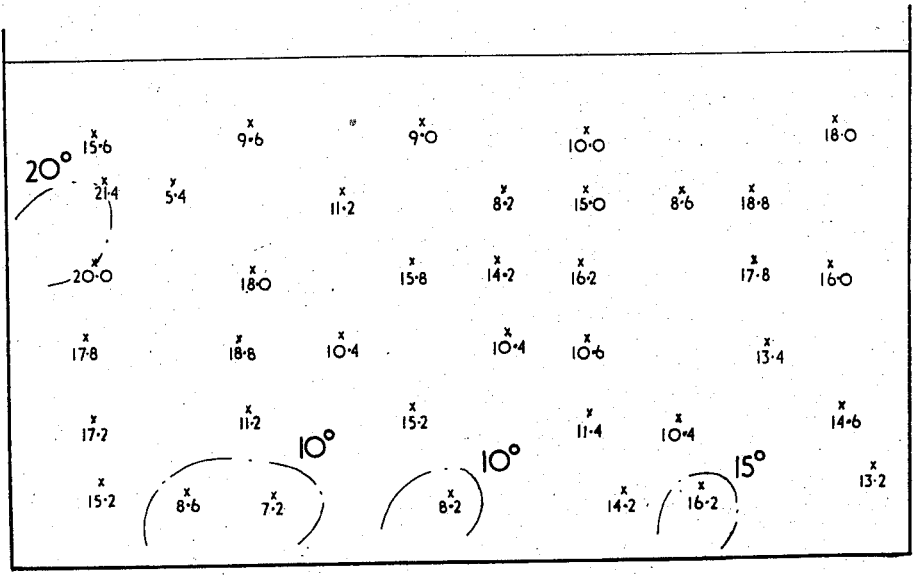
Figure 10:
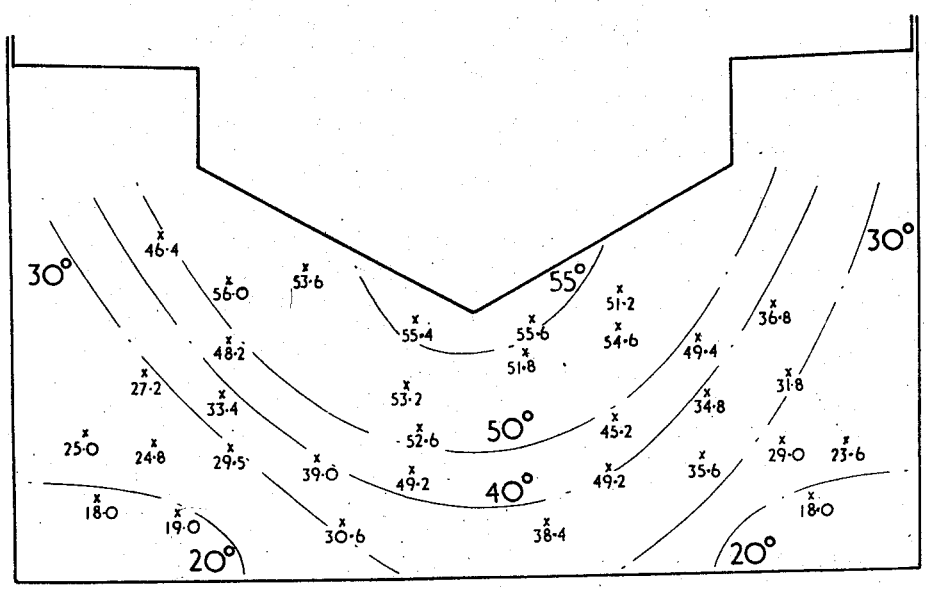

Figure 9 which is the simple push press strain diagram shows that the angular shear strain reaches 20° at only one small locality, the greater part of this briquette being under a shear strain of less than 14°; Figure 10 which is the corresponding diagram for a briquette made with the apparatus of Figures 4 to 6 shows the greater part of the briquette at an angular shear strain of 30° and a substantial part at 50°.

*Example 3*

23 grams of alumina trihydrate, of below 60 mesh B. S. S. were briquetted at 18° C., and a pressure of 12.5 tons/sq. in. This briquette had a strength of 112 lbs./sq. in. The corresponding simple push briquette made at 12.5 tons/sq. in. gave a strength of 38 lbs./sq. in.

Figure 11:
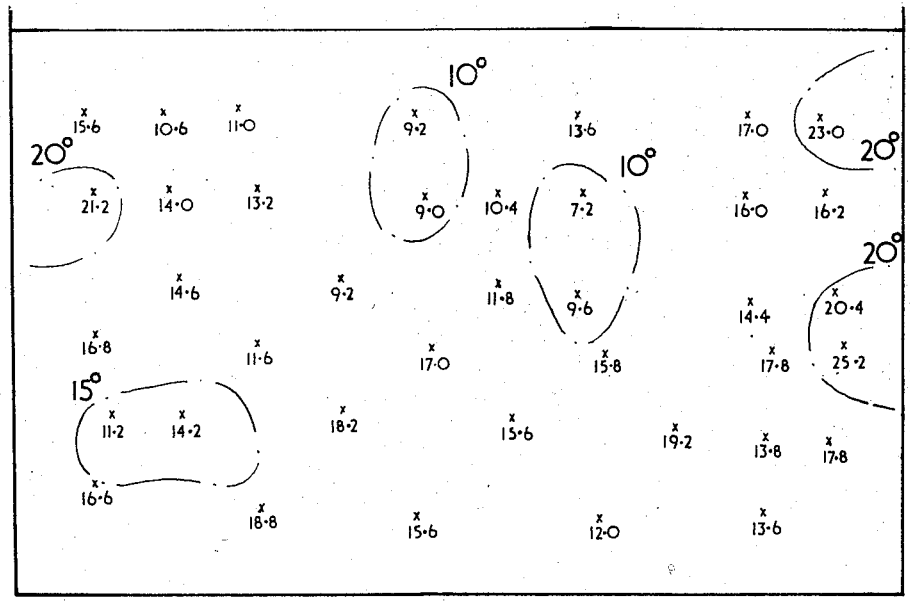
Figure 12:
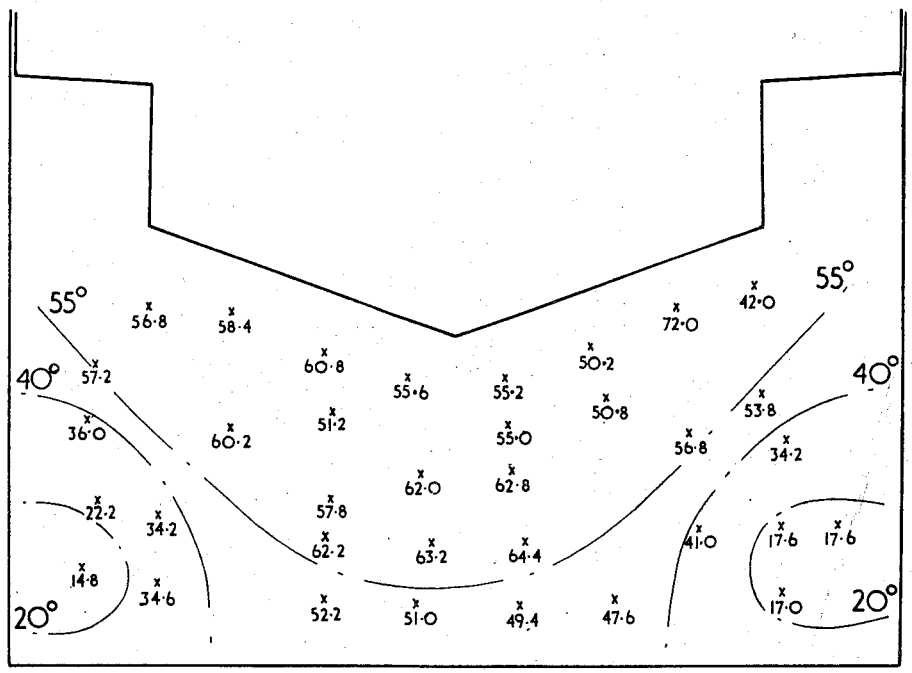

Figure 11 is the simple push press strain diagram and shows three small isolated regions with an angular shear strain of 20°, the greater part of the briquette being under a strain of less than 16°. In Figure 12 which shows the corresponding strains in a briquette made by the process of the invention, most of the mass is under a strain of 40° and a substantial part is at 55°.

*Example 4*

20 grams of black coal of rank 201, volatile content 12.5%, ash content 6.8%, moisture content 1%, ground to a size below 30 mesh B. S. S. were briquetted at a temperature of 18° and at a pressure of 4½ tons per square inch. This briquette had a strength of 173 lbs. per square inch. The corresponding simple-push briquette made under otherwise identical conditions gave a strength of 37 lbs. per square inch.

*Example 5*

20 grams of black coal of rank 902 having a volatile content 40%, ash content 8%, moisture content 13%, of size below 30 mesh B. S. S. were briquetted at a temperature of 120° C. and a pressure of 6 tons per square inch. The resulting briquette had a strength of 600 lbs. per square inch while a simple push briquette made under the same conditions had a strength of 95 lbs. per square inch.

*Example 6*

20 grams of black coal, rank 401, volatile content 37.1%, ash content 4.1%, moisture content 1.5% and of size below 30 mesh B. S. S. were briquetted with the apparatus of Figures 4–6 at a temperature of 18° C. and at a pressure of 6 tons/sq. in. This briquette had a strength of 185 lbs./sq. in. The corresponding simple push briquette made under the same conditions gave a strength of 45 lbs./sq. in.

*Example 7*

20 grams of black coal, rank 902, volatile content 40%, ash content 8%, moisture content 13%, of size below 30 mesh B. S. S. and 60% below 200 mesh were briquetted at a temperature of 125° C. and a pressure of 6 tons/sq. in. The briquette made with the apparatus of Figures 4–6 had a strength of 900 lbs./sq. in. while a simple push briquette made under the same conditions had a strength of 85 lbs./sq. in.

Figure 13:
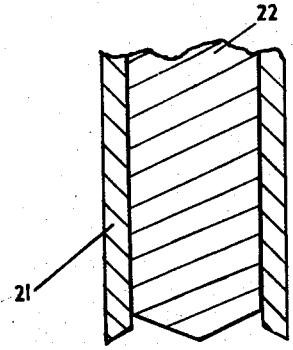
Figure 13 illustrates a third form of press.

The required angular shear strain under pressure may also be effected by using a ram (Figure 13) consisting of two parts, an annular sleeve 21 and a cylindrical inner plunger 22 sliding within it. Both parts are moved together into the mould until a predetermined maximum force is developed after which a differential movement between the inner plunger 22 and the outer sleeve 21 is caused to take place so that the inner plunger moves forward relative to the outer sleeve.

Angular shear strain under pressure may also be achieved in double roll or ring roll briquetting presses. It is also possible to achieve angular shear strain under pressure by extruding the briquette through a die which changes its cross section in the direction of movement of the mass from a circle to an ellipse or a rectangle to a parallelogram.

In some cases it will be preferable to hold the coal particles in a mould of approximately hemispherical form so that the outer surface follows the general form of one of the contours of the angular shear strain distribution (e. g. the 40° curve in Figure 8). It is also preferable that the depth of the briquette shall be approximately half the diameter.

Figure 14:
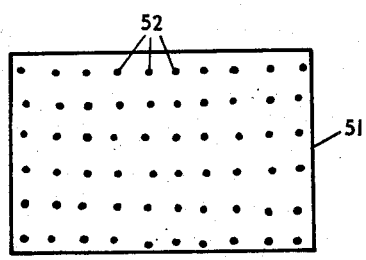
Figures 14 to 16 illustrate a method of measuring shear strain.
Figure 15:
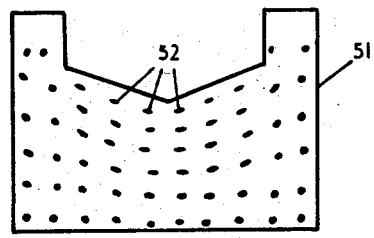
Figure 16:
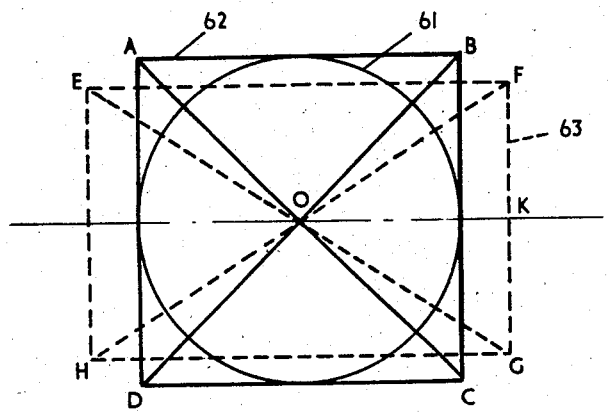

Figures 14 to 16 illustrate one method of measuring angular shear strain.

A quantity of particles for making a briquette is divided into a number of equal parts, say six, intended to form layers of equal thickness placed one above the other in a mould 51. As shown in Figure 14 along the diameter of each layer are arranged equidistant spherical pellets 52 of a readily deformable material having a Brinell hardness comparable with that of the finished briquette. In the example illustrated the pellets are lead balls 0.05 inch diameter.

The whole mass is briquetted, thus displacing and deforming some or all of the pellets (Figure 15) and the ratio of the maximum to the minimum diameter of each pellet is measured, e. g. by X-ray photography of the finished briquette.

Referring to Figure 16, assuming a sphere 61 of centre O is enclosed in a square 62 which after deformation becomes a rectangle 63, the angular shear strain is taken as the sum of the angles BOF and GOC. The ratio R of the maximum to minimum diameter is OK/KF and the angular shear strain is therefore given by the expression $$2 \tan^{-1} R - \frac{\pi}{2}$$

We are aware as stated in the fourth and fifth paragraphs hereof that briquettes may be made without a binder by the use of a simple push press provided special precautions therein mentioned are taken. We make no claim to such briquetting processes and the claims set forth hereunder are to be construed as excluding such known processes.

We claim:

1. A method of making a high strength briquette without a binder which comprises the steps of applying a load to a quantity of particles to compact the particles into a compacted mass whereby a relatively small angular shear strain may be produced, and then applying a load to at least a part of the said compacted mass so as to substantially change the shape of such part of the mass and create within the greater part of the compacted mass an angular shear strain of relatively larger and pre-determined magnitude.

2. A method of making a high strength briquette without a binder according to claim 1 wherein said load applied to change the shape of the compacted mass has a value not less than that of said load applied to compact the particles.

3. A method of making a high strength coal briquette without a binder which comprises the steps of applying a pressure not greater than 8 tons/in.² to a quantity of coal particles to compact said particles into a compacted mass whereby a relatively small angular shear strain may be produced, and then applying further pressure not substantially less than the first mentioned pressure and not greater than 8 tons/in.² to at least a part of the said compacted mass so as to substantially change the shape of such part of the mass and create within the greater part of the compacted mass an angular shear strain of relatively larger and pre-determined magnitude.

4. A method according to claim 3 wherein the said relatively larger angular shear strain is not less than 15°.

5. A method of making a high strength briquette which comprises the steps of applying pressure to a quantity of particles to compact the particles into a compacted mass, and then applying further pressure to at least a part of the said compacted mass so as to substantially change the shape of such part of the mass and create an angular shear strain of not less than 20 degrees within the greater part of the mass.

6. A method according to claim 5 wherein the particles are of black coal.

7. A method according to claim 5 wherein the briquette is formed from the particles by a continuous pressure.

8. A method according to claim 5 wherein pressure is applied in two discontinuous stages.

9. A method according to claim 5, wherein the mass of particles is held in a mould, the walls of which are moved so as to cause the mass to undergo angular shear strain.

10. A method according to claim 5 wherein the mass of particles is moved bodily through an extrusion die having a cross section which varies in the direction of movement of the mass.

11. A method according to claim 5 wherein the further pressure is applied over an outer surface of the mass of particles by direct application of pressure to an area less than the whole area of said surface.

12. A method according to claim 5 wherein the particles are briquetted in a mould of which a surface is curved to follow approximately one of the contours of equal angular shear strain.

13. A method of making a briquette according to claim 5 wherein the particles are heated before or during the application of pressure.

14. A method of making a briquette according to claim 5 wherein the starting material is coal and the coal briquette is subsequently carbonised.

15. A method according to claim 5 wherein the particles are of metallic material.

16. A method of making a briquette according to claim 5 wherein said further pressure has a value not less than that of said pressure to compact said particles.

17. A method according to claim 8 wherein the pressures applied in the discontinuous stages are of the same magnitude.

18. A method according to claim 8 wherein the pressure applied in the second stage is the greater.

19. A method according to claim 11 wherein the said further pressure is directly applied only to an area occupying a central region of said surface to form a depression at said area.

20. A method of making a high strength briquette which comprises the steps of applying pressure to a quantity of particles to compact the particles into a compacted mass, maintaining said compacted mass under pressure and simultaneously applying further pressure to at least a part of said mass so as to substantially change the shape of such part of the mass and create an angular shear strain of not less than 20° within the greater part of the mass.

21. A method of making a briquette according to claim 20 wherein said further pressure has a value not less than that of said pressure to compact said particles.

22. A method of making a high strength briquette which comprises the steps of applying pressure to a quantity of particles to compact the particles into a compacted mass, maintaining said compacted mass under pressure, and, while maintaining said mass under pressure, applying further pressure to at least a part of said mass so as to substantially change the shape of such part of the mass and create an angular shear strain of not less than 30° within the greater part of the mass.

References Cited in the file of this patent

UNITED STATES PATENTS 2,350,971     Pecker et al.             June 6, 1944

FOREIGN PATENTS 440,811     Great Britain             Jan. 8, 1936